United States Patent
Marcus

[19]

[11] Patent Number: 5,820,183
[45] Date of Patent: Oct. 13, 1998

[54] GRADUATED TOOL HANDLE

[76] Inventor: Kenneth D. Marcus, 3601 Hudson Rd., Mascot, Knox County, Tenn. 37806

[21] Appl. No.: 816,187

[22] Filed: Mar. 12, 1997

[51] Int. Cl.[6] .................. B25G 1/00; A01B 1/00
[52] U.S. Cl. .................. 294/57; 294/49; 294/51; 7/164; 33/485; 33/486
[58] Field of Search .................. 294/49, 50.6, 50.7, 294/51, 57, 59; 7/114, 116, 163, 164; 33/483–486, 491; 172/239; 116/230, DIG. 23, DIG. 46, DIG. 47

[56] References Cited

U.S. PATENT DOCUMENTS

| 630,924 | 8/1899 | Pickens | 7/164 |
|---|---|---|---|
| 1,028,767 | 6/1912 | Remington | 7/164 |
| 1,068,792 | 7/1913 | Mackintosh | 7/116 |
| 1,983,815 | 12/1934 | Schmiett | 294/49 |
| 2,192,399 | 3/1940 | Downes | 33/75 |
| 2,501,757 | 3/1950 | Cagle | 7/164 |
| 2,791,879 | 5/1957 | Truran | 294/50.6 |
| 3,088,208 | 5/1963 | Mitchell | 33/485 |
| 3,273,930 | 9/1966 | Gottfried | 294/50.7 |
| 5,310,231 | 5/1994 | Burkhart | 294/59 |

FOREIGN PATENT DOCUMENTS 313087  7/1919  Germany .................. 294/49

*Primary Examiner*—Dean Kramer
*Attorney, Agent, or Firm*—Pitts & Brittian, P.C.

[57] ABSTRACT

An improved graduated tool handle for providing ready measurement of selected regions of a work area. Improved graduated tool handle (10) is readily adaptable for use with various implements such as rakes, shovels, and post-hole diggers. Improved tool handle (10) is graduated to indicate increments of feet, inches and fractions of an inch. Indicia (26) is provided to identify values in feet and further indicia (28) can provide ready reference to one half foot (½') dimensions. Markings (20), (22) and (24) are readily visible on any side of improved tool handle (10), and indicia (26) and (28) are provided on the front and rear sides of improved tool handle (10). A band marker (45) is provided so as to allow ready reference of a desired distance measurement. Markings (22) and (24) and indicia (26) and (28) can be inscribed in improved tool handle (10) in any assorted manner and in the preferred embodiment, are printed or painted a high visibility color in stark contrast from the color of the handle.

18 Claims, 6 Drawing Sheets

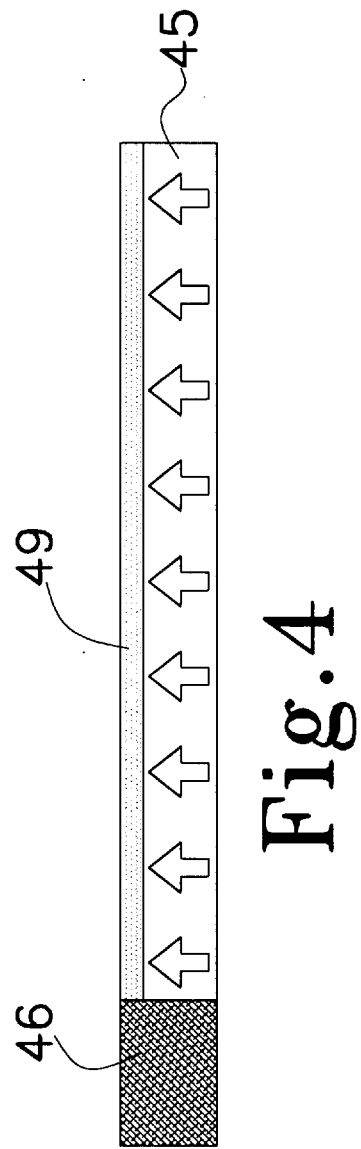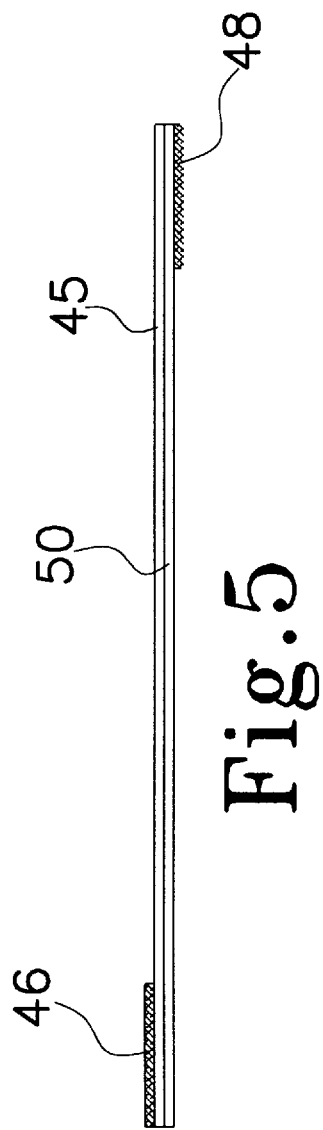

GRADUATED TOOL HANDLE

TECHNICAL FIELD

This invention relates to the field of tool handles. More particularly, it relates to an improved tool handle having an integral measuring device along the length of the handle.

BACKGROUND ART

In using various tools, such as post-hole diggers, shovels, rakes and other such tools, it is often necessary to take a measurement from the work area. For instance, while manually digging a post-hole, there is a frequent need to measure the depth of the hole during the process of digging the hole. This is necessary to insure that the hole is deep enough for the particular application and at the same time to insure that the hole has not been dug too deeply. Similarly, it is often necessary to measure the depth of, for instance, a gravel bed or the layer of concrete as one is preparing a concrete patio or driveway. As another example, those skilled in the art, are also aware of the need to frequently measure the depth of a trench that is being prepared for a footer. Typically this is done by placing the tool that one is working with on the ground, reaching for a conventional tape measure and taking the measurement. While this by itself is time consuming, with each of the examples recited above, there is also the attendant risk of the tape becoming coated with either mud or concrete and requiring cleaning. Again, this is also time consuming.

It is also common, in the example of digging a post-hole, for the person digging the post-hole to cut, or scratch, a notch in the handle. However, while this solves the need to reach for a tape measure, as holes of various depths are dug, the number of notches in the handles can become confusing. It is also possible for the notches to be confused with normal wear on the handles.

U.S. Pat. No. 2,192,399, which issued to J. J. Downes on Mar. 5, 1940, discloses a tool handle that has a longitudinal groove that has a strip of suitable metal fixed in the bottom of the groove. Downes's strip of metal is graduated to indicate inches and fractions thereof. As disclosed by Downes, one or more markers may be pressed into the groove to indicate fixed points of measurement that may be desired. As those skilled in the art have come to recognize, Downes's longitudinal groove can become caked with dirt, mud or concrete making it difficult to read the graduations. Moreover, Downes's marker requires a handle of a specific configuration, namely having the disclosed longitudinal groove, in order to be used. Further, by placing the graduated strip of metal and the associated markers in a groove, the measurement is only visible when the handle is correctly oriented with reference to the viewer.

Accordingly, it is an object of the present invention to provide an improved tool handle having integral graduations for indicating feet, inches and fractions of inches.

It is a further object of the present invention to provide an improved tool handle in which the graduations are visible from substantially any point of reference around the handle.

It is yet another object of the present invention to provide an improved graduated tool handle that includes a marker for designating points of reference that is also visible about the circumference of the handle.

Other objects and advantages over the prior art will become apparent to those skilled in the art upon reading the detailed description together with the drawings as described as follows.

DISCLOSURE OF THE INVENTION

In accordance with the various features of this invention, an improved graduated tool handle is provided. The improved graduated tool handle is suitable for use with various tools including, but not limited to, post-hole diggers, rakes, shovels, hoes and concrete rakes. The improved tool handle is graduated so as to indicate feet, inches and fractions thereof. In the preferred embodiment, the graduations are identified such that the measurements are taken from the proximal end of the tool, (it being understood that the distal end provides the point of attachment for the blade of the tool). In the preferred embodiment, the tool handle is circumferentially graduated in ¼" markings, with feet and half-foot dimensions identified with readily visible indicia on each side of the handle. In this fashion, the markings and indicia are readily visible from substantially any point of reference around the handle. A brass cap is provided at the proximal end of the handle in order to reduce wear at the proximal end and to thus insure accuracy of the measurements.

A band marker is also provided so as to allow ready reference of a desired marking. In this regard, a strip of material is provided with cooperating VELCRO® tabs at each end. The elongated strip is dimensioned so as to be substantially equal to the circumference of the handle. Thus, when the ends are overlapped, the marker is held in place by a tight frictional fit.

BRIEF DESCRIPTION OF THE DRAWINGS

FIG. 4 shows a plan view of the discrete measurement marker of the present invention.

FIG. 5 shows a side view of the discrete measurement marker of the present invention.

BEST MODE FOR CARRYING OUT THE INVENTION

Figure 1:
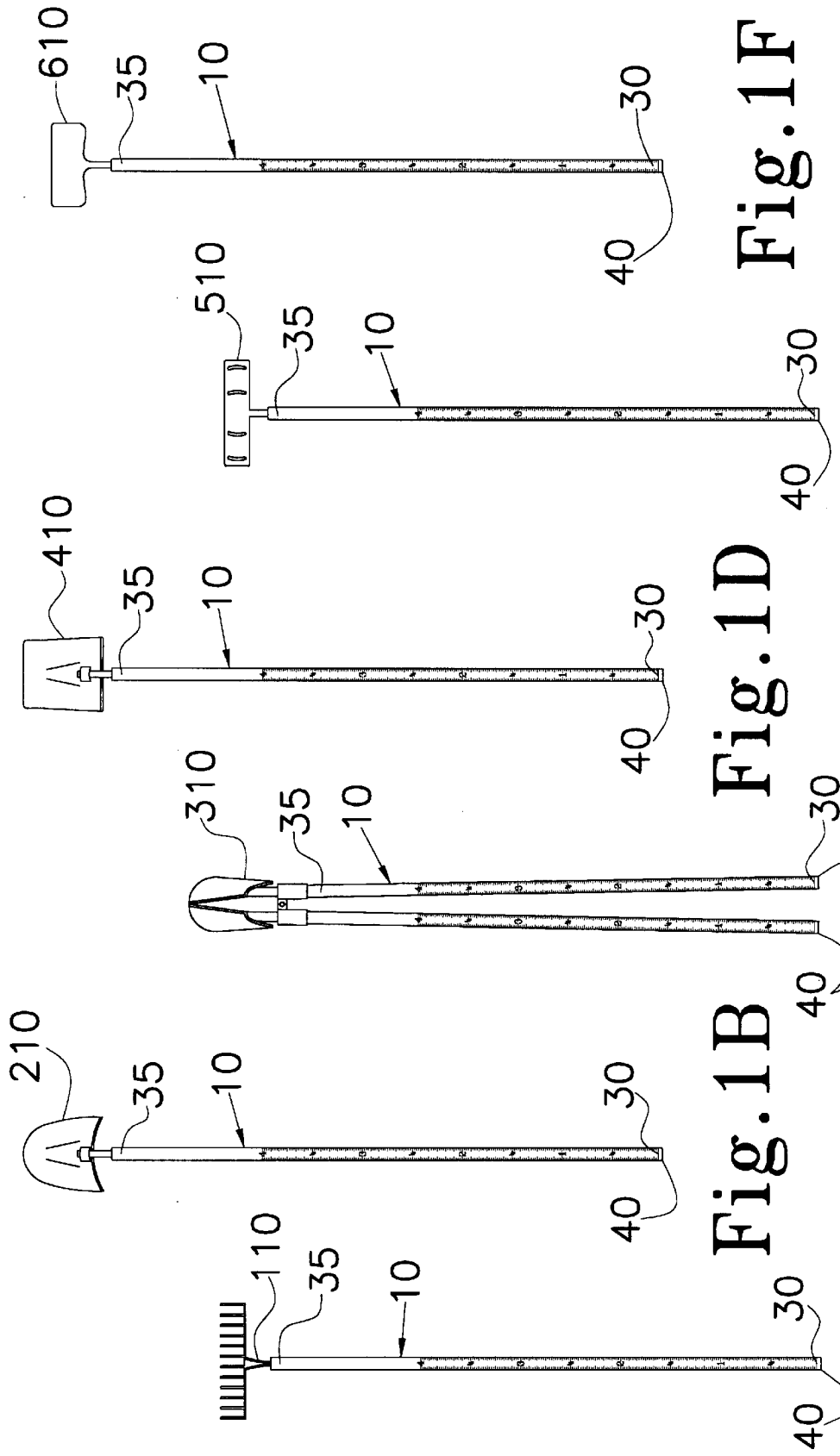
FIG. 1 A–F illustrates elevation views of various tools implementing the graduated handle of the present invention.

An improved graduated tool handle, constructed in accordance with the present invention, is illustrated generally as 10 in the figures. Improved graduated tool handle 10 is readily adaptable for use with various implements including, but not limited to, rake 110, round nose shovel 210, post-hole digger 310 square nose shovel 410 concrete rake 510 or hoe 610. As seen more clearly in FIGS. 2, 2A, 7 and 7A, improved tool handle 10 is graduated. In this regard, improved tool handle 10 is provided with a plurality of graduations defined by markings 20 to indicate increments of feet, markings 22 to indicate increments of inches and markings 24 to indicate increments of a fraction of an inch. While certain skilled artisans may require smaller divisions of the inch, in the preferred embodiment markings 24 designate one-quarter inch (¼") increments. Moreover, those skilled in the art will also recognize that improved graduated tool handle 10 could also be provided with metric divisions (not shown), either together with or as a substitute for, traditional English dimensions. Further, indicia 26 is provided to identify values in feet and indicia 28 provides ready reference to one half foot (½') dimensions. In the preferred embodiment, indicia 26 is ordered in value such that the measurements are taken from proximal end 30 of improved tool handle 10. When reference is made to proximal end 30 of improved tool handle 10, it will be understood that this is the end of improved tool handle 10 that is conventionally gripped by a user, with distal end 35 being adapted for receiving, and being the point of attachment for, the blade of a given implement.

Figure 2:
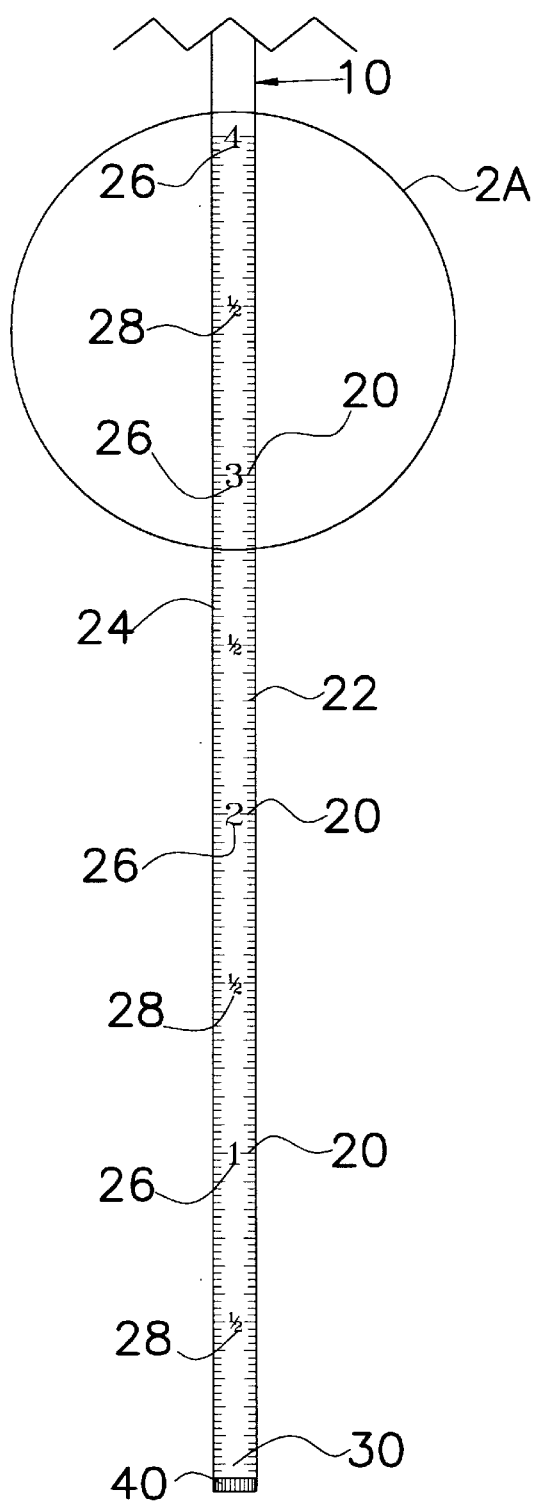
FIG. 2 shows an enlarged front elevation view of the graduated handle of the present invention.
Figure 2A:
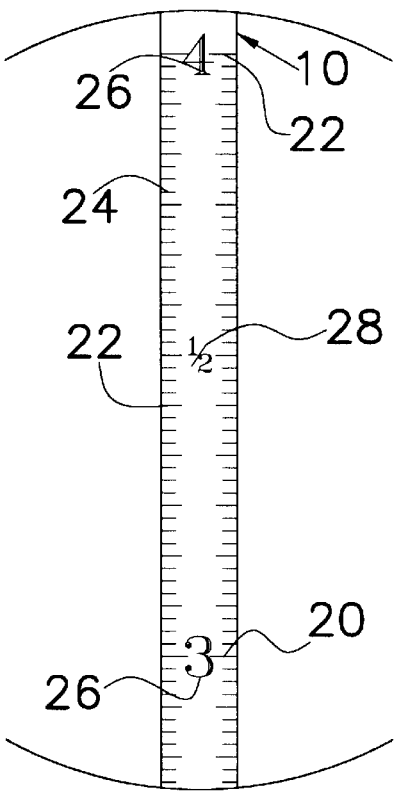
FIG. 2A shows a further enlarged front elevation view of the graduated tool handle illustrated in FIG. 2 taken at line 2A.
Figure 2B:
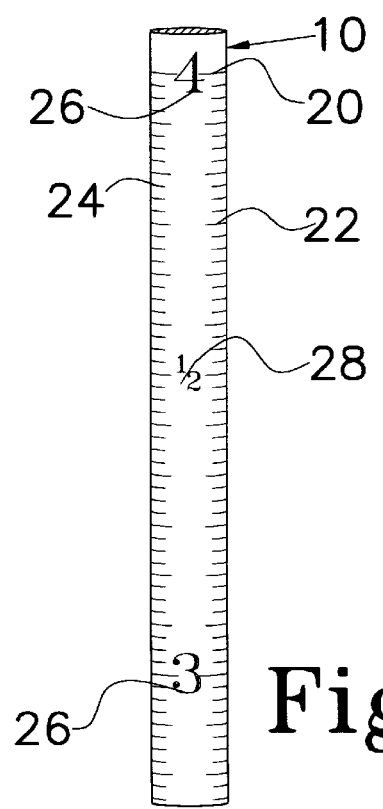
FIG. 2B shows a rear perspective view of the graduated tool handle illustrated in FIG. 2A.

In the preferred embodiment, markings 20, 22 and 24 are readily visible on any side of improved tool handle 10. Further, as seen on FIGS. 2A and 2B, indicia 26 and 28 are provided on the front and rear sides of improved tool handle 10. In this fashion, markings 22 and 24 and indicia 26 and 28 are readily visible from substantially any point of reference around the handle. Also in the preferred embodiment, in order to reduce wear on proximal end 30 of improved tool handle 10 which would negatively impact the accuracy of a measurement taken with improved tool handle 10, a brass cap 40 is provided at proximal end 30 of improved tool handle 10 in order to reduce wear at proximal end 30.

Referring to FIGS. 4, 5, 6 and 7, a band marker 45 is provided in the preferred embodiment so as to allow ready reference of a desired discrete distance measurement. In this regard, an strip of material is provided with cooperating VELCRO® sections 46 and 48 at each end of band marker 45. The elongated strip is flexible and is dimensioned so as to be substantially equal to the circumference of improved tool handle 10. Thus, when the ends are overlapped so as to allow VELCRO® sections 46 and 48 to engage, the marker is held in place by a tight frictional fit. To assist in this tight frictional fit and prevent band marker 45 from sliding on improved tool handle 10, band marker 45 is provided with a non-slip backing 50. Non-slip backing 50 can be constructed from any non-slip material and is preferably constructed of neoprene or other rubber-type material. In the preferred embodiment, band marker 45 is provided with a contrasting region 49 which serves to underscore the desired measurement when band marker 45 is wrapped around improved tool handle 10. It will be appreciated by those skilled in the art that inasmuch as band marker 45 is wrapped around improved tool handle 10, it likewise is readily visible from substantially any point of reference around improved tool handle 10. The flexibility of band marker 45 allows band marker 45 to be wrapped around a handle of any geometric cross-section. Moreover, by being wrapped around improved tool handle 10 and the use of cooperating VELCRO® sections 46 and 48 at each end of band marker 45 allows band marker 45 to be readily detachable for cleaning in the event that band marker 45 becomes soiled with use.

Improved tool handle 10 can be constructed of any conventional tool handle material, including, but not limited to, solid wood, composite, fiberglass, or other similarly strong rigid materials. Markings 22 and 24 and indicia 26 and 28 can be inscribed in improved tool handle 10 in any assorted manner. In this regard, markings 22 and 24 and indicia 26 and 28 can be etched or scribed into the material, stamped or molded into improved tool handle 10 or simply printed or painted on improved tool handle 10. In the preferred embodiment, improved tool handle 10 has a selected background color and markings 22 and 24 and indicia 26 and 28 are printed or painted a selected color, wherein the color is selected so as to provide high visibility and be in stark contrast from the background color.

Figure 3:
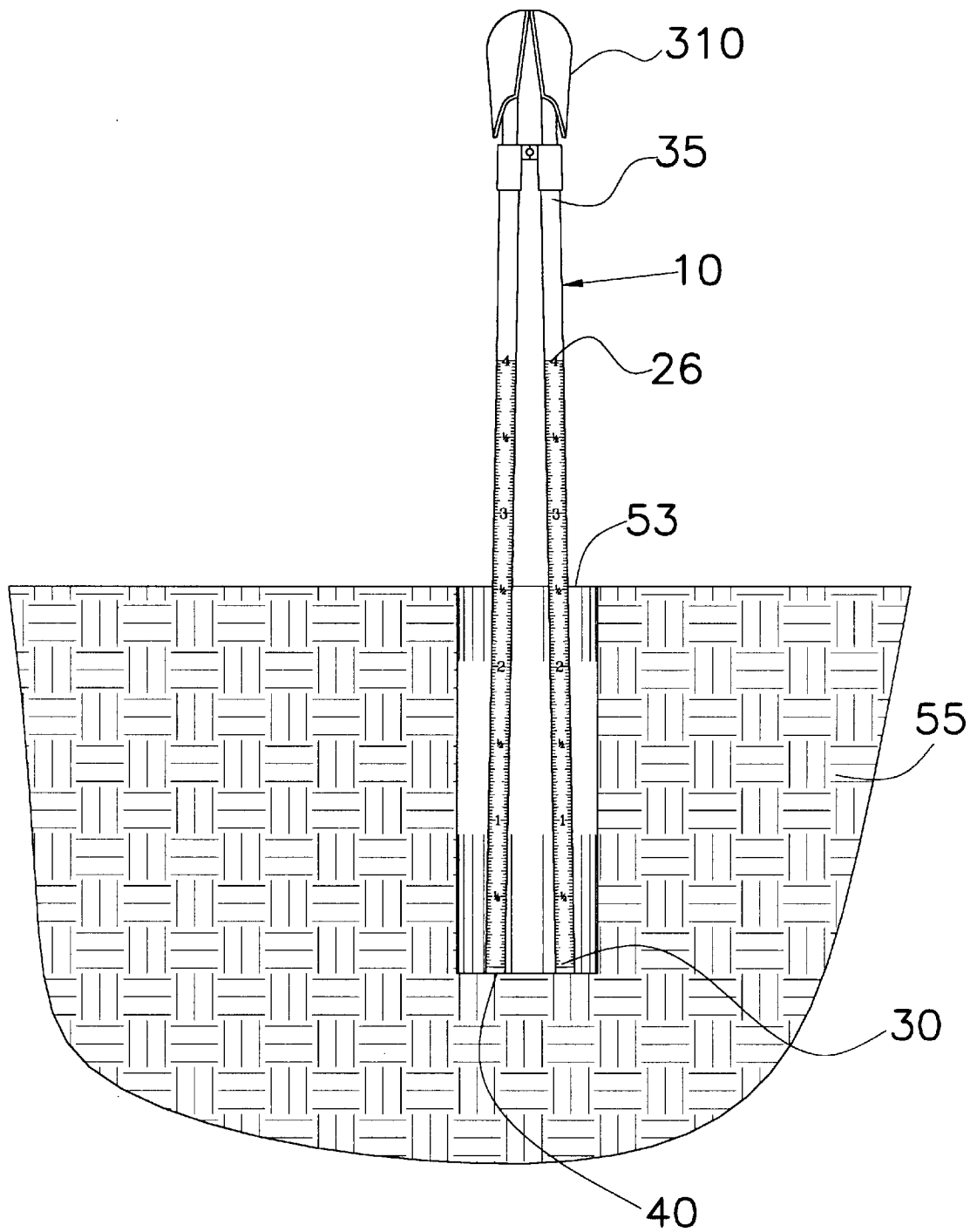
FIG. 3 shows an elevation view, with the ground in partial section, of the graduated tool handle of the present invention in use for measuring the depth of a post-hole.
Figure 6:
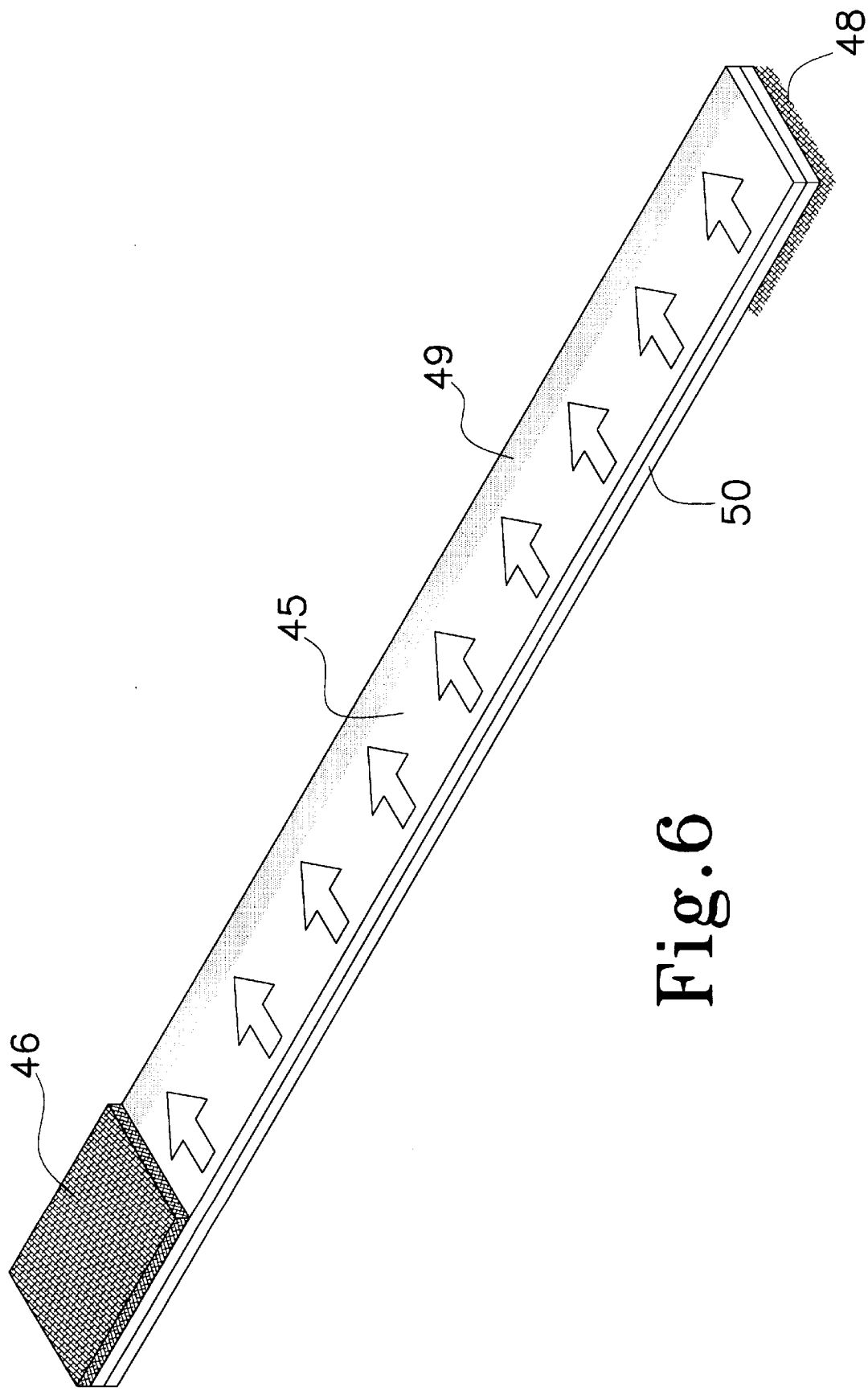
FIG. 6 shows a perspective view of the measurement marker of the present invention.
Figures 7, 7A:
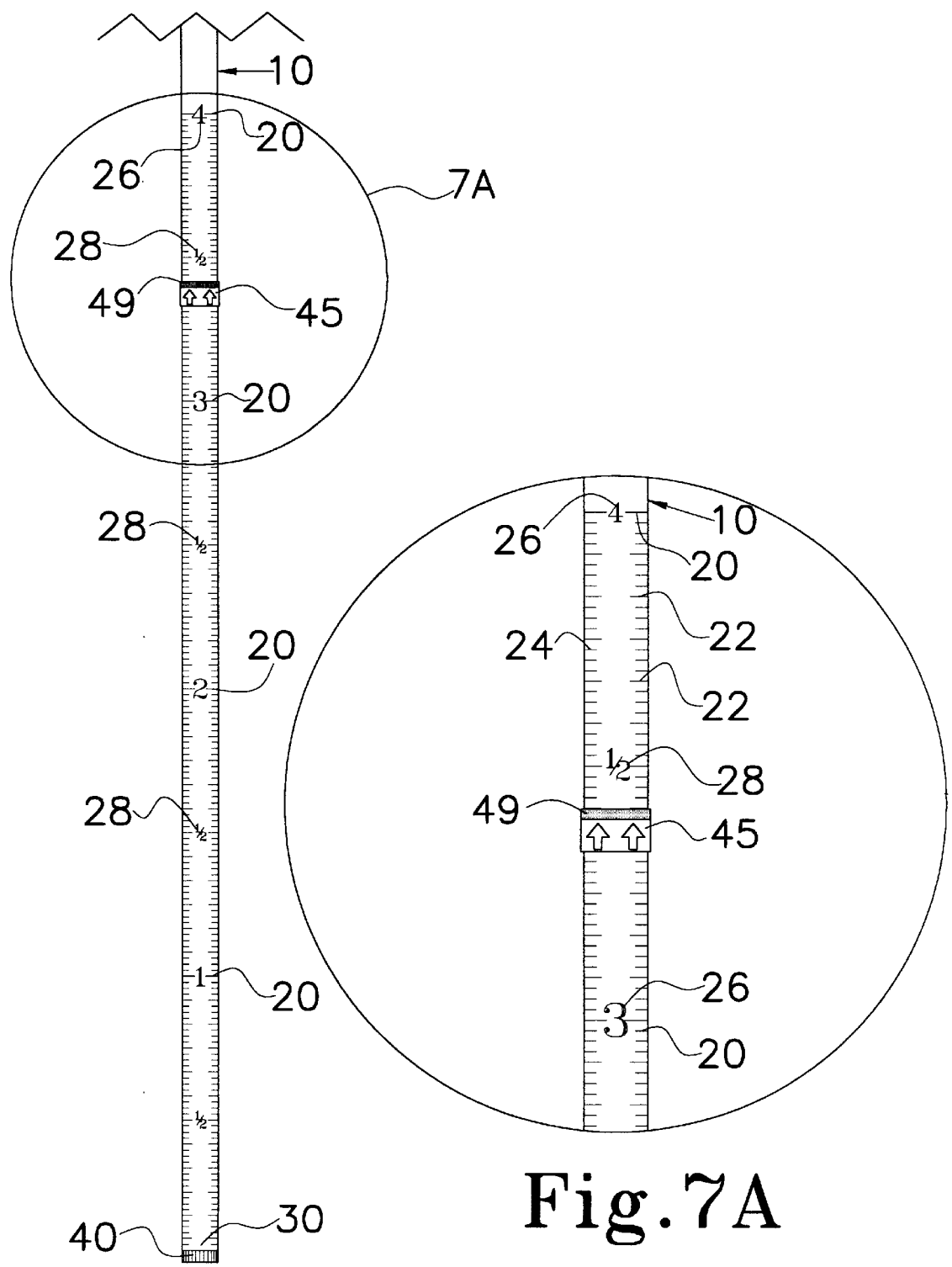
FIG. 7 shows an enlarged elevation view of the graduated handle of the present invention with the discrete measurement marker affixed thereto.
FIG. 7A shows a further enlargement of the graduated tool handle illustrated in FIG. 7 taken at line 7A.

Referring to FIG. 3, improved tool handle 10 is shown in use with post-hole digger 310. Post-hole digger 310, as those skilled in the art will appreciate, is useful for digging post-holes, such as hole 53 in ground 55. Post-hole digger 310 has been inverted and placed into hole 53 to allow the user (not shown) to measure the depth of hole 53, which is approximately 2½ feet deep. There are many other uses of improved tool handle 10 and the foregoing is recited merely as an example of one such use.

From the foregoing description, it will be recognized by those skilled in the art that n improved tool handle offering advantages over the prior art has been provided. Specifically, the improved tool handle provides a tool handle having integral graduations for indicating feet, inches and fractions of inches which are visible from substantially any point of reference around the handle. Further, the improved tool handle of the present invention includes a marker for designating points of reference that is also visible about the circumference of the handle.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, I claim:

1. An improved tool handle, said improved tool handle comprising:

an elongated handle member having a proximal end adapted for gripping and a distal end adapted for receiving an implement wherein said elongated handle member has a selected geometric cross-section;

a plurality of graduations defining units of linear measure carried by said elongated handle;

indicia carried by said handle, wherein said indicia is associated with said graduations and identifies selected units of measurement; and a flexible band marker adapted for being wrapped around said selected geometric cross-section of said elongated handle member for marking a selected measurement whereby said selected measurement is marked for ready reference and wherein said flexible band marker is defined by an elongated strip of material having cooperating hook and loop tabs at each end, and a high contrast region for underscoring said selected measurement, wherein said flexible band marker is readily detachable from said improved tool handle.

2. The improved tool handle of claim 1 wherein said graduations are divided in increments of feet.

3. The improved tool handle of claim 1 wherein said graduations are divided in increments of inches.

4. The improved tool handle of claim 1 wherein said graduations are divided in increments of fractions of inches.

5. An improved tool handle, said improved tool handle comprising:

an elongated handle member having a proximal end adapted for gripping and a distal end adapted for receiving an implement;

a plurality of graduations defining units of linear measure carried by said elongated handle wherein said graduations are inscribed substantially circumferentially about said handle whereby said graduations are readily visible around a circumference of said improved tool handle;

indicia carried by said handle, wherein said indicia is associated with said graduations and identifies selected units of measurement; and a flexible band marker for wrapping around said improved tool handle for marking a selected measurement whereby said selected measurement is marked for ready reference.

6. The improved tool handle of claim 5 wherein a plurality of indicia is inscribed around said circumference of said tool handle whereby said indicia is readily visible around said circumference of said improved tool handle.

7. The improved tool handle of claim 5 wherein said improved tool handle further comprises a brass cap carried by said proximal end for protecting said proximal end from wear.

8. The improved tool handle of claim 5 wherein said flexible band marker is defined by an elongated strip of material having cooperating hook and loop tabs at each end, and a high contrast region for underscoring said selected measurement, wherein said flexible band marker is readily detachable from said improved tool handle.

9. An improved tool handle, said improved tool handle comprising:

an elongated handle member having a proximal end adapted for gripping and a distal end adapted for receiving an implement;

a plurality of graduations defining units of linear measure carried by said elongated handle, wherein said graduations are inscribed substantially circumferentially about said handle whereby said graduations are readily visible around a circumference of said improved tool handle;

a plurality of indicia carried by said handle, wherein said indicia is associated with said graduations and identifies selected units of measurement, further wherein said plurality of indicia is readily visible around said circumference of said improved tool handle;

a flexible band marker for wrapping around said improved tool handle for marking a selected measurement whereby said selected measurement is marked for ready reference, said flexible band marker being defined by an elongated strip of material having cooperating hook and loop tabs at each end, and a high contrast region for underscoring said selected measurement, wherein said flexible band marker is readily detachable from said improved tool handle; and a brass cap carried by said proximal end for protecting said proximal end from wear.

10. The improved tool handle of claim 9 wherein said graduations are divided in increments of feet.

11. The improved tool handle of claim 9 wherein said graduations are divided in increments of inches.

12. The improved tool handle of claim 9 wherein said graduations are divided in increments of fractions of inches.

13. The improved tool handle of claim 9 wherein said improved tool handle has a selected geometric cross-section and said flexible band marker is adaptable for being wrapped around said selected geometric cross-section.

14. An improved tool handle, said improved tool handle comprising:

an elongated handle member having a proximal end adapted for gripping and a distal end adapted for receiving an implement, said elongated handle member having a selected geometric cross-section;

a plurality of graduations defining units of linear measure carried by said elongated handle, wherein said graduations are inscribed substantially circumferentially about said handle whereby said graduations are readily visible around a circumference of said improved tool handle;

a plurality of indicia carried by said handle, wherein said indicia is associated with said graduations and identifies selected units of measurement, further wherein said plurality of indicia is readily visible around said circumference of said improved tool handle;

a flexible band marker for wrapping around said improved tool handle for marking a selected measurement whereby said selected measurement is marked for ready reference, said flexible band marker being defined by an elongated strip of material having cooperating hook and loop tabs at each end, and a high contrast region for underscoring said selected measurement, wherein said flexible band marker is readily detachable from said improved tool handle; and a brass cap carried by said proximal end for protecting said proximal end from wear.

15. The improved tool handle of claim 14 wherein said graduations are divided in increments of feet.

16. The improved tool handle of claim 14 wherein said graduations are divided in increments of inches.

17. The improved tool handle of claim 14 wherein said graduations are divided in increments of fractions of inches.

18. The improved tool handle of claim 14 wherein said band marker includes a non-slip backing for gripping said handle member whereby inadvertent movement of said band marker is prevented.

* * * * *